US006868255B1

(12) United States Patent
Chanteau et al.

(10) Patent No.: US 6,868,255 B1
(45) Date of Patent: Mar. 15, 2005

(54) METHOD OF TRANSMITTING RETURN SIGNALS TO A SATELLITE FROM A VIDEOCOMMUNICATION SIGNAL DISTRIBUTION NETWORK

(75) Inventors: Pierre Chanteau, La Haye Malherbe (FR); Reynald Edouard, Val de Reuil (FR); Américo Brajal, Villeneuve le Roi (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/503,966

(22) Filed: Feb. 14, 2000

(30) Foreign Application Priority Data

Feb. 16, 1999 (FR) .............................. 99 01871

(51) Int. Cl.$^7$ .............................................. H04B 7/185
(52) U.S. Cl. ..................... 455/12.1; 455/3.02; 455/13.3
(58) Field of Search .............................. 455/3.01–3.06, 455/13.1, 12.1, 4.1, 63, 427, 3.1–3.6; 725/63, 73, 81, 67; 370/480, 312, 320, 329

(56) References Cited

U.S. PATENT DOCUMENTS

| | | | | | |
|---|---|---|---|---|---|
| 5,231,494 | A | * | 7/1993 | Wachob | 348/385.1 |
| 5,257,029 | A | * | 10/1993 | Miyo | 342/352 |
| 5,276,904 | A | * | 1/1994 | Mutzig et al. | 725/68 |
| 5,883,661 | A | * | 3/1999 | Hoarty | 725/93 |
| 5,940,750 | A | * | 8/1999 | Wang | 455/318 |
| 5,956,346 | A | * | 9/1999 | Levan | 370/480 |
| 6,002,359 | A | * | 12/1999 | Chen | 342/352 |
| 6,122,482 | A | * | 9/2000 | Green et al. | 725/68 |
| 6,356,539 | B1 | * | 3/2002 | Zuliani et al. | 370/320 |
| 6,519,446 | B2 | * | 2/2003 | Tawil et al. | 455/3.02 |
| 6,522,865 | B1 | * | 2/2003 | Otten | 455/13.1 |
| 2003/0043771 | A1 | * | 3/2003 | Mizutani et al. | 370/338 |
| 2003/0189587 | A1 | * | 10/2003 | White et al. | 345/716 |

OTHER PUBLICATIONS

IN Pub. No. WO 97/49240 Chanteau, Pierre. Video communication network. Dec. 24, 1997.*
Description of an Interactive Satellite System based on the European ACTS ISIS Project, IUT Telecom Inter@active97, Session GII.6.
"Digisat–s3m: the interactivity for SMATV users" by a. Molina and j. Sesena in proceedings of the Ruropean Conference On Multimedia Applications, Services And Techniques, mai 1998 (May 1998), pp. 233–245.
"TR 101 201 VL.1.1.; DVB, Interaction channel for Satellite Master Antenna Television (SMATV) systems, Guidelines for the version based on Satellite and Coaxial sections." European Telecommunications Standards Institute, Oct. 1997, pp. 1–40.

* cited by examiner

*Primary Examiner*—Nick Corsaro
*Assistant Examiner*—Tan Trinh

(57) ABSTRACT

An antenna system (1) transmits return signals, for example, in the band Ka, based on signals received from a distribution network in the band from 2.5–3 GHz. The return signals are transmitted through the network from a user receiver (PC) with a frequency lying below 65 MHz, they are processed in a frequency converter (up-C) between the network and the antenna system so as to be delivered to the antenna system with a frequency lying in the 2.5–3 GHz band, and frequency management data received in the downstream channel are used in the frequency converter (up-C) for selecting the frequency in the 2.5–3 GHz band.

7 Claims, 2 Drawing Sheets

Figure 1:
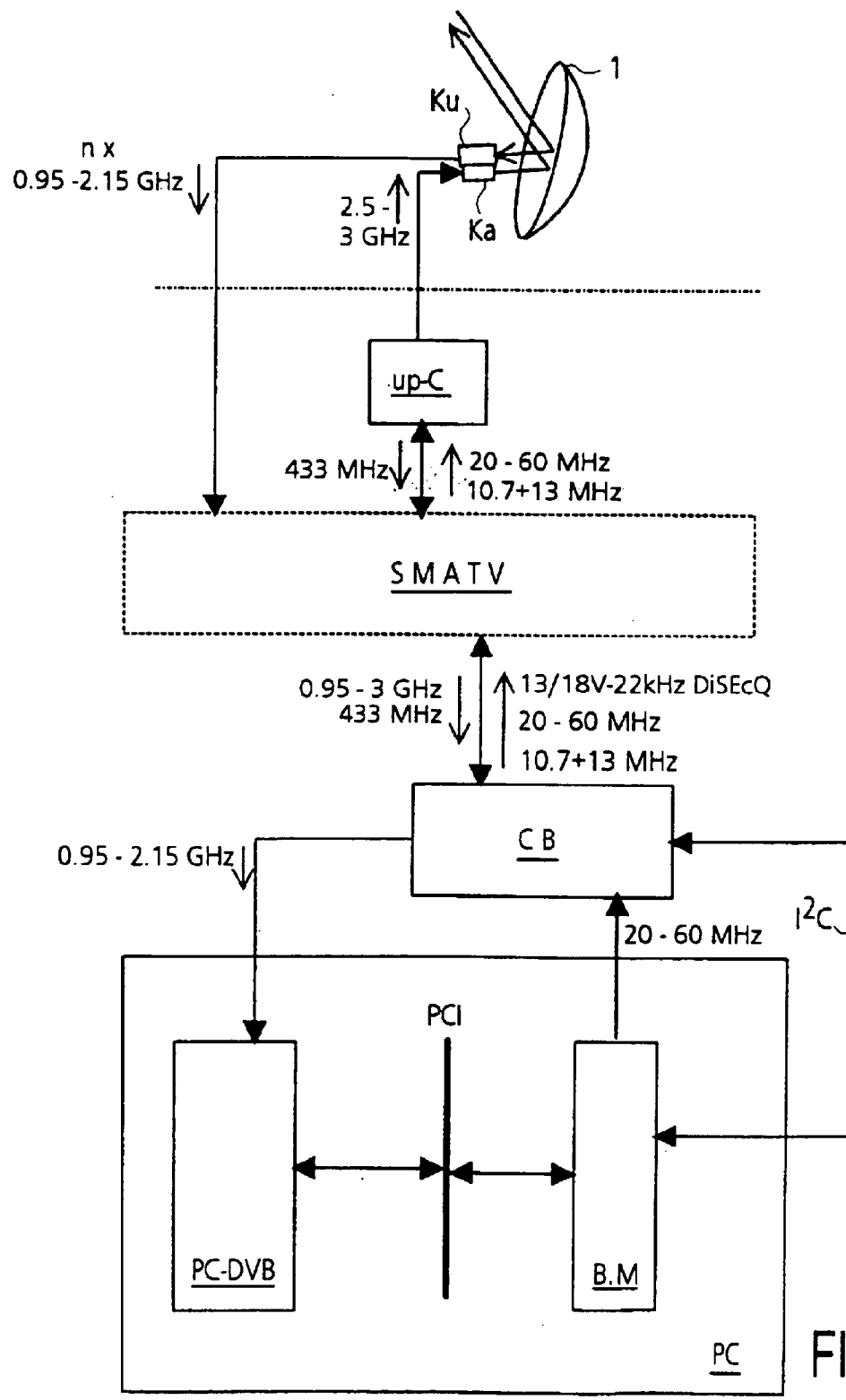

METHOD OF TRANSMITTING RETURN SIGNALS TO A SATELLITE FROM A VIDEOCOMMUNICATION SIGNAL DISTRIBUTION NETWORK

The present invention relates to a method of transmitting signals called return signals from a signals distribution network comprising an antenna system that is capable of transmitting return signals to a satellite in a first frequency band based on signals received from the network in a second frequency band which lies in the upper part of the television frequency band used in the network, in which method signals comprising, inter alia, data for the frequency management of the return signals are received in a channel called downstream channel intended to serve a plurality of user receivers.

The invention also relates to a signals distribution network comprising an antenna system that is capable of transmitting signals called return signals to a satellite in a first frequency band based on signals received from the network in a second frequency band which lies in the upper part of the television frequency band used in the network, and comprising a channel called downstream channel intended to supply signals to a plurality of user receivers and producing, inter alia, data for the frequency management of the return signals.

The invention further relates to a unit intended to serve as an interface between a signals distribution network and a user receiver, and a frequency translation unit intended to serve as an interface between a videocommunication network and an antenna system.

Such a method and such devices are provided, inter alia, to enable homeworking for which a satellite communication with the employer is used. They may also be used in any type of telecommunication.

Such an antenna system, associated to a user receiver, is known from the document "Description of an Interactive Satellite System based on the European ACTS ISIS project", in ITU TELECOM Inter@ ctive 97, Session GII.6. According to this document, return signals are produced at an intermediate frequency "IF" known to a person of ordinary skill in the art to lie between 2.5 and 3 GHz, and they are converted to the band Ka (29.5–30 GHz) to be transmitted to the satellite.

For optimizing the return of data to a satellite, the operator assigns the channels for the return signals in a dynamic manner, and frequency positioning data relating to the transmission in the band Ka are transmitted to the users in the downward stream which is brought to the user device via a cable called "receiving" cable. This downward stream is the normalized stream DVB-S which transports in MPEG2-TS packets both technical signaling signals and applications requested by users.

An interactive user receiver utilizes these data for the frequency control of an agile synthesizer which produces a return channel signal whose center frequency may vary between 2.5 and 3 GHz. This signal goes up from the receiver via another cable than the receiving cable to the transmitter in the band Ka where a predefined conversion translates it to between 29.5 and 30 GHz. This concept, in which the frequency agility is concentrated at the level of the receiver, in essence has three drawbacks in an SMATV system:

The necessity of using two cables on the entire link between the antenna and the interactive receiver;
The use of a 2.5 to 3 GHz frequency band for a coaxial cable return channel, which is in conflict with the 88 MHz to 3 GHz frequency band of the downstream channel of the current SMATV systems;
A bandwidth of the return channel that is much larger than that of the conventional return channels: 500 MHz to be compared with the 60 MHz of the European normalized return channel which stretches out from 5 to 65 MHz maximum. The 500 MHz bandwidth of this return channel is only justified by the necessity of a frequency agility of 500 MHz, that is to say, the possibility of changing the frequency at any moment within a 500 MHz band, whereas the net rates considered (several hundred kbits/s) are infinitely less selectable in the passband.

It is an object of the invention to permit the use of the transmission method in collective distribution networks by removing the drawbacks mentioned above. The passband used for transmitting the data back into the network is to be much less than 500 MHz, and yet a final agility that can run up to 500 MHz is required.

For this purpose, the return signals are transmitted through the network from a user receiver with a frequency lying below the television frequency band used in the network, these return signals are subjected to a frequency translation on the output of the network to the antenna system, so that they are delivered to the antenna system to be transmitted there with a frequency lying in the second frequency band, and the frequency management data received in the downstream channel are used during the said frequency translation to select the frequency to be produced in the second frequency band.

A signals distribution network according to the invention comprises a complementary unit which plays the role of interface between the usual elements of the network and a user receiver and is formed by first means for receiving from the network and delivering to the user receiver the downstream channel signals and the frequency management data, and for transmitting, from a user receiver to the network, return signals whose frequency lies below the television frequency band used in the network and frequency management data, a frequency translation unit which plays the role of interface between the usual elements of the network and the antenna system and is formed by second means for receiving return signals whose frequency lies below the television frequency band used in the network, for subjecting these return signals to a frequency translation that brings them to the second frequency band, and for delivering these return signals, after translation, to the antenna system to be transmitted there by this system, and third means for transmitting to the frequency translation unit frequency management data which are received via the network, intended to permit the second means to select the frequency to be used in the second frequency band.

A unit, intended to serve as an interface between a signals distribution network and a user receiver comprises means for receiving from the network and delivering to the user receiver downstream channel signals and data for managing the return frequencies and for transmitting from the user receiver to the network, return signals whose frequency lies below the television frequency band used in the network and the frequency management data.

A frequency translation unit intended to serve as an interface between a network and an antenna system includes means for receiving return signals whose frequency lies below the television frequency band used in the network, for subjecting these return signals to a frequency translation that brings them to a second frequency band situated high up in the television frequency band used in the network, and for delivering these return signals, after translation, to the antenna system to be transmitted there by this system.

Particular embodiments of the invention will appear in the dependent claims 2–3 and 5–7.

These and other aspects of the invention are apparent from and will be elucidated, by way of non-limitative example, with reference to the embodiments described hereinafter.

Figure 2:
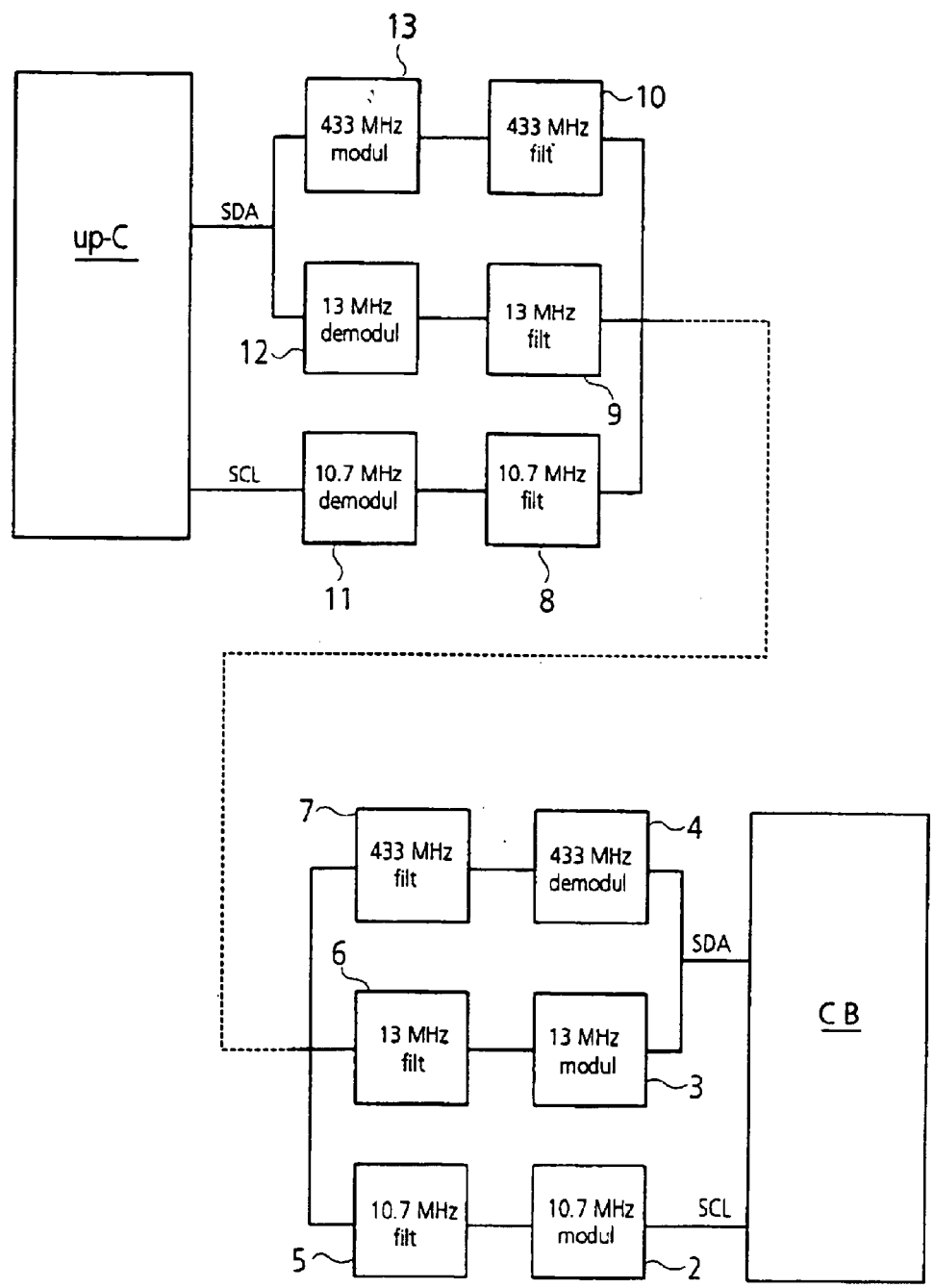

In the drawings:

FIG. 1 is a diagram showing a signals distribution network, comprising an antenna system and connected to a user receiver, and FIG. 2 shows in more detail a control data link between a frequency translation unit and a complementary unit.

In the system shown in FIG. 1, the user receiver device, which interacts with a transmitter, is a personal computer, for example of the type "PC". It is evident that the invention could also be applied to other types of devices, for example, a digital television decoder which uses the same physical and access control layers.

The antenna system comprises a dish antenna 1 at the focus of which is located a traditional receiving converter, for example, for MPEG2 DVB signals in the band Ku (12 GHz). The return channel is transmitted to the satellite via a transmitter situated practically also in the focus of the dish antenna, which sends return signals, for example here in the band Ka. A return signal occupies a band whose width may lie between 100 kHz and 3 MHz. For example, signals are to be transmitted whose rate is 1 Mbits/s.

In a converter unit up-C the frequency agility in a system according to the invention is moved to above the distribution network. If necessary, this unit also provides the remote power supply of the transmitter.

The transmission in the band Ka is effected according to a frequency-division process and also time-division process: each user is authorized to transmit in a time window, this window being determined by the operator of the satellite transmission and its definition being transmitted in the form of data in the downward stream; for this purpose, the operator is to know the list of the users who are grouped in the same collective distribution network "SMATV", because the same time window must not be assigned to two users of this network, whereas this can be done for two users of different SMATV networks.

A unit called complementary unit CB receives the downstream data from the receiving cable in a channel it selects in the 88 MHz–3 GHz band; the downstream data are not in conflict with the return channel data which are produced by the complementary unit CB in a 20–60 MHz frequency band, for example, with a fixed center frequency of 44 MHz. A limited band from 20–60 MHz is chosen although the 5–65 MHz band is available, in order to make room for technical signals for controlling the transmitter.

The personal computer PC comprises, inter alia:
a pulse modulator/demodulator B.M for supplying in the form of I$^2$C coded signals digital data to the unit CB, or receiving them therefrom; this element B.M. comprises a processor that can process the management data of the return frequencies, received in the downstream channel, so as to give orders resulting therefrom to the network;
a receiver for receiving digital videocommunication transmissions PC-DVB which receives and demodulates digital videocommunication transmissions coming from this same unit;
an interface PCI provided between these two elements.

The I$^2$C signals, in addition to frequency data, convey data for adjusting the power level of the transmitter in the band Ka.

A modulation of the I$^2$C data is realized in the complementary unit CB so as to permit the routing through the network.

The 44 MHz channel is transposed in the unit up-C into a channel lying, for example, between 2.5 and 3 GHz, that is to say, high up in or above the television frequency band used in the network. The frequency in this channel is chosen as a function of the I$^2$C data produced by the complementary unit CB.

The system transmits downstream signals, here at 433 MHz, to the unit CB from the unit up-C, return signals at 10.7 and 13 MHz for controlling the translation as well as habitual signals 13/18V-22 kHz DiSEcQ for controlling switches SMATV.

In FIG. 2 the complementary unit CB sends clock signals SCL via the network symbolized by a dotted line and it receives and sends data signals SDA. The clock signals SCL, which are transmitted at the same time as the data SDA during the return transmit time windows, are modulated at 10.7 MHz in a modulator 2 and filtered in a bandpass filter 5. The transmitted data signals SDA are modulated at 13 MHz in a modulator 3 and filtered in a bandpass filter 6. The received data signals SDA are filtered at 433 MHz in a bandpass filter 7 and demodulated in a demodulator 4.

The unit up-C receives clock signals SCL and it receives and sends data signals SDA. The clock signals SCL pass through a bandpass filter 5 at 10.7 MHz and are demodulated in a demodulator 11. The received signals SDA pass through a bandpass filter 9 at 13 MHz and are demodulated in a demodulator 12. The signals SDA which are sent are modulated at 433 MHz in a modulator 13 and pass through a bandpass filter 10.

It should be understood that the verb "to comprise" does not exclude the presence of other elements or steps than those listed in a claim.

What is claimed is:

1. A method of transmitting signals called return signals from a signals distribution network comprising an antenna system that is capable of transmitting return signals to a satellite in a first frequency band based on signals received from the network in a second frequency band which lies in the upper part of the television frequency band used in the network, in which method signals comprising, data for the frequency management of the return signals are received in a channel called downstream channel intended to serve a plurality of user receivers, wherein
   the return signals are transmitted through the network from a user receiver with a frequency lying below the television frequency band used in the network,
   these return signals are subjected to a frequency translation on the output of the network to the antenna system, so that they are delivered to the antenna system with a frequency lying in the second frequency band, and
   the frequency management data received in the downstream channel are used during said frequency translation to select the frequency to be produced in the second frequency band, wherein the management data of the return frequencies, which are received in the downstream channel, are processed in the user receiver after which orders resulting therefrom are supplied to the network and the signals representing said orders are coded in the form known as I$^2$C.

2. A method as claimed in claim 1, wherein the return signals are transmitted through the network in the 20–60 MHz frequency band.

3. A method as claimed in claim 1, wherein I$^2$C clock signals are modulated on a first frequency to be transmitted from the user receiver to the antenna system, I²C data signals are modulated on a second frequency to be transmitted from the user receiver to the antenna system, and I²C data signals are modulated on a third frequency to be transmitted from the antenna system to the user receiver.

4. A signals distribution network comprising an antenna system that is capable of transmitting signals called return signals to a satellite in a first frequency band based on signals received from the network in a second frequency band which lies in the upper part of the television frequency band used in the network, and comprising a channel called downstream channel intended to supply signals to a plurality of user receivers and conveying, inter alia, data for the frequency management of the return signals, wherein a unit called complementary unit which plays the role of interface between the usual elements of the network and a user receiver and is formed by first means for receiving from the network and delivering to the user receiver the downstream channel signals and the frequency management data, and for transmitting, from a user receiver to the network, return signals whose frequency lies below the television frequency band used in the network and frequency management data, a frequency translation unit which plays the role of interface between the usual elements of the network and the antenna system and is formed by second means for receiving return signals whose frequency lies below the television frequency band used in the network, for subjecting these return signals to a frequency translation that brings them to the second frequency band, and for delivering these return signals, after translation, to the antenna system to be transmitted by this system; third means for transmitting to the frequency translation unit frequency management data which are received via the network, intended to permit the second means to select the frequency to be used in the second frequency band wherein the frequency translation unit comprises means for using frequency management data which are sent thereto via the network and the complementary unit comprises means for receiving, modulating and transmitting to the network signals that represent said management data, which are brought thereto in the form of I²C data, and the frequency translation unit comprises means for receiving and demodulating the said I²C data.

5. A signals distribution network as claimed in claim 4, wherein the first means transmit the return signals in the 20–60 MHz frequency band.

6. A signals distribution network as claimed in claim 4, wherein the complementary unit comprises means for modulating I²C clock signals on a first frequency and transmitting them to the network, the frequency translation unit comprises means for receiving I²C clock signals from the network and demodulating them, the complementary unit comprises means for modulating I²C data signals on a second frequency and transmitting them to the network, the frequency translation unit comprises means for receiving I²C data signals from the network and demodulating them at this second frequency, the frequency translation unit comprises means for modulating I²C data signals on a third frequency and transmitting them to the network, and the complementary unit comprises means for receiving I²C data signals from the network and demodulating them at the third frequency.

7. A signals distribution network as claimed in claim 4, wherein the complementary unit and the frequency translation unit also provide the remote power supply of the transmitter.

\* \* \* \* \*